United States Patent Office 3,451,403
Patented June 24, 1969

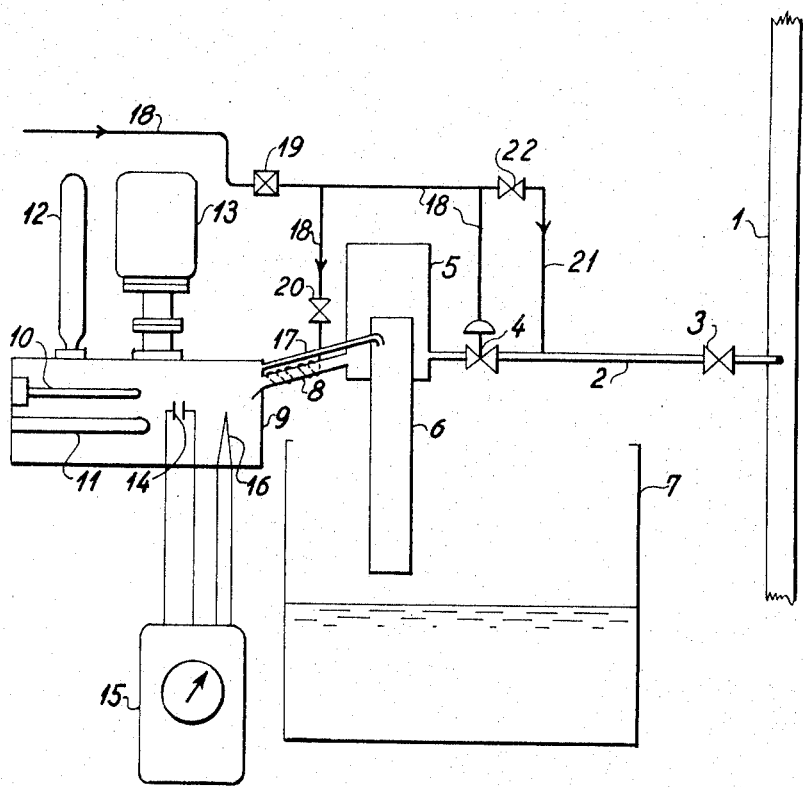

3,451,403
METHOD AND APPARATUS FOR DETERMINING THE PURITY OF A FLOWING SOLUTION OR MIXTURE
Rud F. Madsen, Nakskov, Denmark, assignor to Aktieselskabet de Danske Sukkerfabrikker, Copenhagen, Denmark
Filed Mar. 14, 1966, Ser. No. 534,197
Claims priority, application Denmark, Mar. 19, 1965, 1,413/65
Int. Cl. G01n 27/10; G05d 11/13
U.S. Cl. 137—5                                   4 Claims

ABSTRACT OF THE DISCLOSURE

A method and apparatus are disclosed for determining the purity of a flowing solution or mixture by measuring its maximum conductivity. A stream of the solution or mixture is fed into a container after which a diluting or concentrating agent is fed into the container, and measuring means continuously measures the conductivity of the contents of the container. The conductivity will pass through a maximum and then decline as the diluting or concentrating agent is added. Automatic control means is provided to switch the feed back to the solution or mixture when the conductivity has declined to a predetermined value after passing through the maximum value.

---

This invention relates to a method of determining the purity of a flowing solution or mixture by measuring its maximum conductivity, as well as an apparatus for carrying out the method.

The method and apparatus according to the invention are particularly suitable for determining the purity of solutions containing sugar, and in the following the invention will be described with reference to such purity determination. However, the invention is not limited to this specific use and it will be realized that the technical effect to be described below could also be obtained in the determination of the purity of a wide range of other solutions or mixtures.

The determination of the purity of sugar solutions, whereby it is to be understood the percentage of the solids content of the solution, which is sugar, has previously been performed on the basis of the sugar content determined by polarization and the solids content determined on the basis of the refraction index of the solution. However, this known method suffers from the substantial drawback that it is both troublesome and time consuming and therefore does not provide the desired possibility of performing an accurate checking and control of the processes taking place in the production of sugar.

It is known that the maximum conductivity (H) of a sugar solution is a function of its purity (R) and that the relationship can be approximately expressed by the following equation:

$$R = 100 - K \cdot H$$

where K is a constant.

Thus, it will be possible to calculate the purity of a sugar solution if its maximum conductivity is known.

It is likewise known that the conductivity of a sugar solution of a given purity varies with the total solids content and assumes a maximum value which at a temperature of 20° C. corresponds to a solids content of about 28%, and at a temperature of 70° C. corresponds to a solids content of about 32%. The reason for this is that when the solids content of a sugar solution is changed, two factors acting in opposite directions will influence the conductivity. If, for instance, a relatively concentrated sugar solution of a given purity is diluted, a drop of conductivity will occur as a consequence of the fact that the concentration of the impurities, which comprise substantial quantities of potassium, sodium and calcium ions, is reduced. However, at the same time, the ion movability will be increased as a consequence of the reduction of the viscosity of the solution, whereby the conductivity tends to increase. If the relationship of conductivity to solids concentration is plotted in a co-ordinate system in which the ordinate represents the conductivity and the abscissa, the solids concentration, a curve will be obtained which has a shape of a parabola, the axis of which is parallel to the ordinate axis and the peak of which represents the maximum conductivity.

A method of determining the purity of a sugar solution, based on this recognition, is known and consists in bringing the solids concentration of a solution, the purity of which is to be determined, within a predetermined range where the conductivity of the solutions is at its maximum, the conductivity being measured at this solids concentration.

Now it has been found, however, that the solids concentration at which the conductivity is at its maximum is not constant from solution to solution but varies with the nature and composition of the impurities. Consequently, the determination of the conductivity obtained by using the known method will be inaccurate because the conductivity measured is frequently not the maximum conductivity.

It is the object of the invention to devise a simple and accurate method of measuring the actual maximum conductivity of a flowing solution or mixture. With this object in view, according to the invention, a branch flow of the said solution or mixture and a diluting or concentrating agent, which is indifferent in respect of the conductivity of said solution or mixture, are alternatingly supplied to a container, in which a measurement of the conductivity of its contents is continuously performed, in such a manner that during each period of supply the solids concentration of the contents of the container reaches and passes beyond the point where the conductivity is at its maximum.

When using the method according to the invention for the determination of the purity of a relatively concentrated solution, that is a solution having a solids concentration above that at which the conductivity is at its maximum, a diluting agent is supplied. When, on the other hand, the method is used for determining the purity of relatively diluted solutions, a concentrating agent is supplied.

In either case the supply is cut off only when the conductivity measured has reached a maximum value and has begun dropping again. At this time a new quantity of the solution, the purity of which is to be determined, is supplied and consequently the solids concentration will increase, or decrease as the case may be, while the conductivity again increases.

When the conductivity has reached and passed beyond the maximum value, another changeover to the supply of diluting or concentrating agent, respectively, is performed. In this manner the conductivity meter will register a series of values located in a range about the maximum conductivity. If the meter is provided with a recording device this will record a wave line in which the wave peaks represent the maximum conductivity of the flowing solution, or by suitably calibrating the instrument, the purity of the solution. A substantially continous registration of the maximum conductivity and thereby of the purity may be obtained if the changeover from the supply of solution to the supply of diluting or concentrating agent or vice versa is effected whenever the conductivity measure has dropped from the maximum conductivity to a predetermined value. If this drop only represents a few percent of the maximum conductivity the changeover will take place so frequently that a practically instantaneous registration of the conductivity of the branched-off fraction of the flow of solution will be obtained.

According to a modification of the method, the changeover from the supply of solution or mixture to the supply of diluting or concentrating agent or vice versa is effected after predetermined time intervals. In this case care must be taken that the intervals are sufficiently long to ensure that during these intervals the conductivity measure really passes beyond the maximum point. This embodiment has the advantage that the apparatus required for carrying out the method will be relatively simple.

As a diluting agent, a wide range of liquids may be used that do not change the proportion of the sugar content to the content of impurities in the solution or mixture, the purity of which is to be determined. A particularly advantageous and inexpensive diluting agent is condensate water.

As a concentrating agent, for instance a solution or mixture concentrated by evaporation may be used.

Since the conductivity depends on the temperature, the measurement of the conductivity should, where the conductivity meter is so arranged as to directly show the purity of the solution, be performed at the temperature corresponding to the constant which was used in calibrating the purity scale. Since it will frequently be difficult to fulfill this requirement in practice, the measurement of the conductivity may, according to the invention, preferably be effected with temperature compensation.

The invention also relates to an apparatus for carrying out the method described. According to the invention this apparatus comprises a container with means for continuously measuring the conductivity of the contents thereof and means for alternatingly supplying a branch flow of a flowing solution or mixture, the purity of which is to be determined, and a diluting or concentrating agent which is indifferent in respect of the conductivity of the said solution or mixture, to said container in such a manner that during each period of supply the solids concentration of the contents of the container reaches and passes beyond the point at which the conductivity is at its maximum.

In order to obtain a substantially constant temperature in the container, it is preferably provided with a thermostat and an agitator.

In a preferred constructional form of the apparatus according to the invention, this comprises means for effecting the changeover from the supply of solution or mixture to the supply of diluting or concentrating agent or vice versa when the conductivity measure has dropped from the maximum conductivity to a predetermined value. In practice a conductviity meter is used which, upon reduction of the conductivity below a pre-set value, for instance of a drop amounting to a few percent of the maximum conductivity, opens or closes a magnetic valve which is provided in a supply pipe for diluting agent, whereby another valve, for instance a diphragm valve provided in the supply pipe for the solution or mixture, the purity of which is to be determined, is simultaneously closed or opened, respectively.

In a constructional simpler form, the apparatus according to the invention comprises means for effecting the changeover from the supply of solution or mixture to the supply of diluting or concentrating agent after predeterminate time intervals.

In another preferred form of the apparatus according to the invention, the means for measuring the conductivity are temperature compensated. These means serve to compensate for the temperature variations which are invariably inherent in the use of a thermostat.

The invention will now be described in further detail with reference to the accompanying drawing which illustrates a preferred form of the apparatus according to the invention, said apparatus being particularly suitable for determining the purity of a sugar solution.

In the drawing, 1 is a pipe through which a sugar solution having a solids concentration of 60% to 80% flows. From the pipe 1 a branch pipe 2 is branched off, said branch pipe communicating through a needle valve 3 and a diaphragm valve 4 with a container 5 which is provided with an overflow tube 6 leading to a collecting container (syrup box) 7 and serving as a sample divider. The container 5 communicates through a heat exchanger 8 with a thermostat box 9, which, in addition to a thermostat 10 with appertaining heating element 11, is provided with a thermometer 12, an agitator 13 and an electrode set 14 forming part of a conductivity meter 15. With the conductivity meter 15, which may be an A.C. compensation recorder with built-in control for the magnetic valve, to be mentioned below, is associated a thermister or a resistor 16. The thermostat box 9 is connected through a tube 17 to the overflow tube 6 and thereby communicates with the syrup box 7.

The apparatus also comprises a tube 18 for the supply of a diluting agent in the form of condensate water. In the tube 18 a magnetic valve 19 and a needle valve 20 are provided. Moreover, the tube 18 is connected to the heat exchanger 8 in such a manner that the condensate water supplied through the tube 18, upon passage through the heat exchanger 8, is introduced into the thermostat box 9.

The supply tube for condensate water is also connected with the diaphragm valve 4, and has a branched-off tube 21 in which a needle valve 22 is provided and which is connected to the branch pipe 2 between the needle valve 3 and the diaphragm valve 4.

The operation of the apparatus is as follows. When the apparatus is started the valves 3 and 4 will be opened so that sugar solution may flow through the pipe 2 to the container 5. From there the solution flows through the heat exchanger 8 into the thermostat box 9 which is thereby filled and from which excess solution flows away through the tube 17 into the tube 6 and from there into the syrup box 7. At a certain point the magnetic valve 19 is opened and condensate water then flows through the needle valve 20 into the heat exchanger 8. At the same time the changed pressure in the tube 18 operates the diaphragm valve 4 which is thereby closed. From the heat exchanger 8 the condensate water flows into the thermostat box in which it dilutes the solution present therein, the temperature being maintained substantially constant by means of the thermostat 10 with appertaining heating element 11 while the liquid is at the same time stirred by means of the agitator 13. Since the sugar solution has a solids concentration which is substantially higher than the concentration at which the conductivity is at its maximum, the conductivity meter will register a conductivity gradually increasing as the dilution proceeds. However, upon continued dilution the solids concentration will pass beyond the range where the conductivity is at its maximum and consequently the conductivity will, after a certain time, begin dropping. When a drop in conductivity has occurred which corresponds to the setting of the control member of the conductivity meter 15 for the magnetic valve 19, the latter is operated so as to be closed. Hereby the pressure in the part of the tube 18 communicating with the diaphragm valve 4 will be changed so as to make this open. Hereby a renewed supply of solution through the branch pipe 2 and the container 5 is rendered possible. During this stage the conductivity registered by the conductivity meter will increase to the maximum value and will then again decrease. When a drop of the conductivity to the pre-set value has again occurred, the control member of the conductivity meter 15 again operates the magnetic valve 19 which is thereby opened, whereby the diaphragm valve 4 is simultaneously closed. Hereby the supply of diluting agent through the tube 18 of the heat exchanger 8 is again initiated. This cyclic process is hereafter repeated without interruption. If the control member of the conductivity meter 15 is so adjusted that a changeover of the magnetic valve 19 takes place upon the occurrence of a relatively small drop of conductivity from the maximum conductivity, changeover will take place very frequently, and consequently the graph recorded by the compensation recorder will practically not show any undulations. Thus, a rapid and accurate measurement of the purity of the sugar solution is obtained.

Since the relatively highly concentrated solution may give rise to clogging of the diaphragm valve 4, provision is made to purge the valve 4. The diluting agent is preferably supplied through the tube 18 and the needle valve 22, in the zone between the needle valve 3 and the diaphragm valve 4. The solution flowing through the diaphragm valve 4 has a somewhat lower solids content than the solution in the pipe 1.

I claim:

1. Apparatus for determining the purity of a flowing solution or mixture by measuring its maximum conductivity comprising a container, means for continuously measuring the conductivity of the contents of said container, means for alternately feeding a branch flow of said flowing solution or mixture and a diluting or concentrating agent into said container, control means for said feed into said container, and means associated with said measuring means for actuating said control means when said conductivity drops from the maximum conductivity value to a predetermined value.

2. Apparatus as claimed in claim 1 further comprising means for maintaining the contents of said container at a predetermined constant temperature.

3. A method for continuously determining the purity of a flowing solution or mixture by measuring its maximum conductivity comprising the steps of alternately feeding a branch flow of said solution or mixture and a diluting or concentrating agent into a container while continuously measuring the conductivity of the contents of said container as said conductivity increases to a maximum value and then decreases, and switching said feed into said container when said measured conductivity drops from the maximum to a predetermined value.

4. A method as claimed in claim 3 wherein the contents of said container are maintained at a predetermined constant temperature.

References Cited

UNITED STATES PATENTS

| | | | |
|---|---|---|---|
| 2,899,636 | 8/1959 | Rubricius | 324—30 |
| 3,014,178 | 12/1961 | Dunn | 137—5 |

WILLIAM F. O'DEA, *Primary Examiner*

HOWARD M. COHN, *Assistant Examiner.*

U.S. Cl. X.R.

23—253; 137—93; 324—30